(12) United States Patent
Bres

(10) Patent No.: US 11,038,689 B2
(45) Date of Patent: Jun. 15, 2021

(54) EFFICIENT BLOCK CHAIN GENERATION

(71) Applicant: FinancialForce.com, inc., San Francisco, CA (US)

(72) Inventor: Raphael Bres, San Francisco, CA (US)

(73) Assignee: FinancialForce.com, Inc., San Francisco, CA (US)

( * ) Notice: Subject to any disclaimer, the term of this patent is extended or adjusted under 35 U.S.C. 154(b) by 237 days.

(21) Appl. No.: 15/909,101

(22) Filed: Mar. 1, 2018

(65) Prior Publication Data

US 2019/0273616 A1     Sep. 5, 2019

(51) Int. Cl.
*H04L 9/32* (2006.01)
*H04L 9/08* (2006.01)
*H04L 9/30* (2006.01)
*H04L 9/06* (2006.01)

(52) U.S. Cl.
CPC .......... *H04L 9/3236* (2013.01); *H04L 9/0643* (2013.01); *H04L 9/088* (2013.01); *H04L 9/30* (2013.01)

(58) Field of Classification Search
CPC ..... H04L 9/3236; H04L 9/0643; H04L 9/088; H04L 9/30
See application file for complete search history.

(56) References Cited

U.S. PATENT DOCUMENTS

| | | | |
|---|---|---|---|
| 2018/0102013 A1* | 4/2018 | Spanos | H04L 9/3239 |
| 2018/0211213 A1* | 7/2018 | Vivier | G06Q 10/0838 |
| 2019/0182029 A1* | 6/2019 | Yim | H04L 9/30 |
| 2020/0067697 A1* | 2/2020 | Puddu | G06F 21/602 |

* cited by examiner

*Primary Examiner* — Ashokkumar B Patel
*Assistant Examiner* — William B Jones
(74) *Attorney, Agent, or Firm* — Kokka & Backus, PC

(57) ABSTRACT

Presented here is a system to reduce the computational cost of validating transactions recorded in a block chain by at least 500 million. In one embodiment, no proof of work is required, and the validity of the data stored in the block chain is guaranteed using a combination of private identification associated with one or more authorized users and a hash value propagated from each block to the subsequent blocks in the block chain. In another embodiment, the proof of work required is designed to be mildly computationally expensive, for example, at least 500 million times cheaper than the proof of work required to perform a bitcoin verification. The proof of work required can be increased or decreased based on various factors such as an expected time to add a new block to the block chain and/or current processor performance.

18 Claims, 8 Drawing Sheets

EFFICIENT BLOCK CHAIN GENERATION

TECHNICAL FIELD

The present application is related to cryptocurrencies, and more specifically to methods and systems that can efficiently generate a block chain.

BACKGROUND

A cryptocurrency is a digital currency in which encryption techniques are used to regulate the generation of units of currency and verify the transfer of funds. The cryptocurrency operates independently of a central bank. In cryptocurrency networks, mining is a validation of transactions. The successfully validated transactions are stored in a block chain, a continuously growing list of validated records. For this effort, successful miners obtain new cryptocurrency as a reward. However, validating transactions has become far more computationally complex over the years.

Bitcoin, created in 2009, was the first decentralized cryptocurrency. In June of 2017, the world's bitcoin miners were generating roughly 5 quintillion 256-bit cryptographic hash values every second, according to the all-things-Bitcoin website Blockchain.info. That's a 5 with 18 zeros after it, every second. Estimates by independent researchers suggest the power used per second to mine bitcoins is around 500 megawatts—enough to supply roughly 325,000 homes. Thus, the value of the currency obtained for validating transactions often does not justify the amount of money spent on setting up the processor's, the cooling facilities to overcome the enormous amount of heat they produce, and the electricity required to run them.

SUMMARY

Presented here is a system to reduce the computational cost of validating transactions recorded in a block chain by at least 500 million. In one embodiment, no proof of work is required, and the validity of the data stored in the block chain is guaranteed using a combination of private identification associated with one or more authorized users and a hash value propagated from each block to the subsequent blocks in the block chain. In another embodiment, the proof of work required is designed to be mildly computationally expensive, for example, at least 500 million times cheaper than the proof of work required to perform a bitcoin verification. The proof of work required can be increased or decreased based on various factors such as an expected time to add a new block to the block chain and/or current processor performance.

DETAILED DESCRIPTION

Presented here is a system to reduce the computational cost of validating transactions recorded in a block chain by at least 500 million. In one embodiment, no proof of work is required, and the validity of the data stored in the block chain is guaranteed using a combination of private identification associated with one or more authorized users and a hash value propagated from each block to the subsequent blocks in the block chain. In another embodiment, the proof of work required is designed to be mildly computationally expensive, for example, at least 500 million times cheaper than the proof of work required to perform a bitcoin verification. The proof of work required can be increased or decreased based on various factors such as an expected time to add a new block to the block chain and/or current processor performance.

Efficient Block Chain Generation

Figure 1:
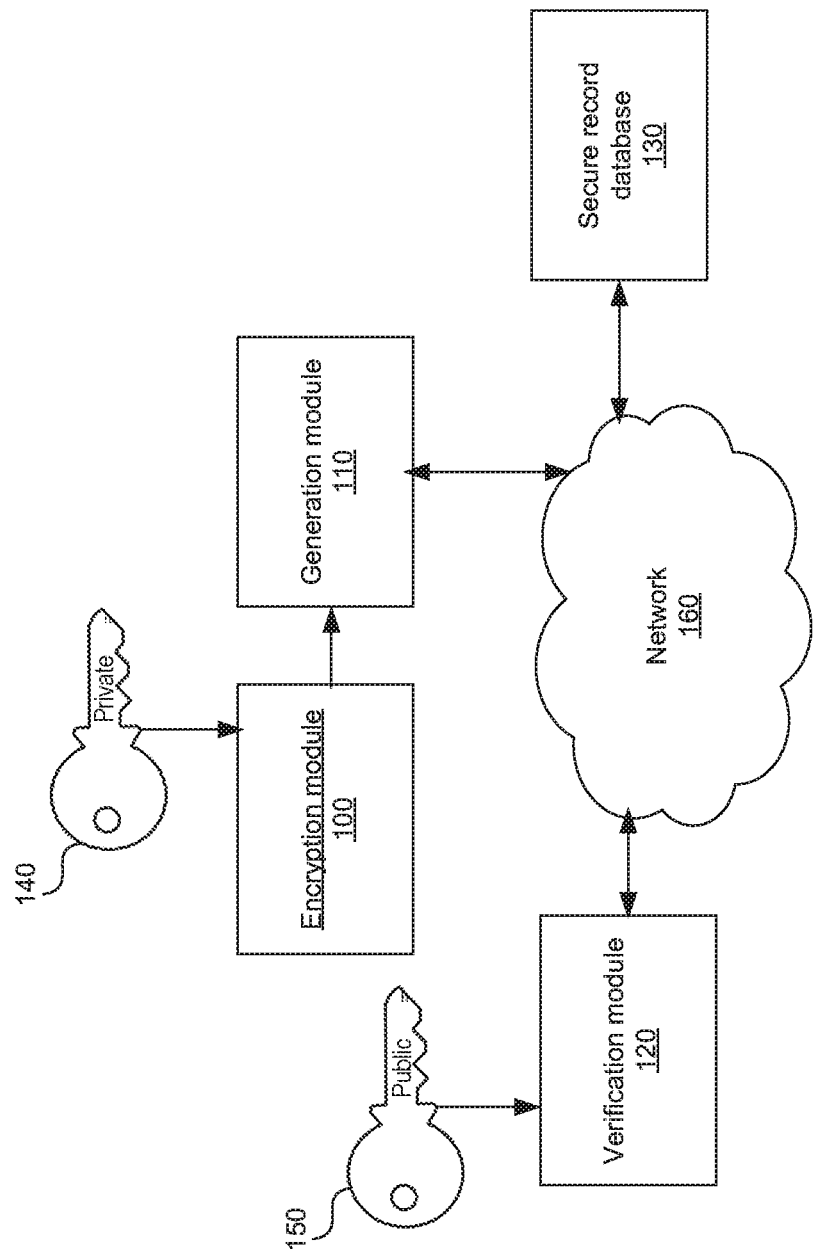
FIG. 1 shows a system to efficiently add a block to a block chain without requiring an expensive proof of work computation.

FIG. 1 shows a system to efficiently add a block to a block chain without requiring an expensive proof of work computation. The system contains an encryption module 100, a generation module 110, a verification module 120, a database 130, a private identification 140 of an authorized user, a public identification 150 of the authorized user, and a network 160.

The encryption module 100, the generation module 110, the verification module 120, and the database 130 can communicate over the network 160. The network 160 can be the Internet, a local area network, a cellular network, a wide area network, etc.

The encryption module 100 can obtain a data to add to the block and to the block chain. The data can be any type of data for which double spending is not a problem. In other words, the data is not a currency, but can be research information generated on a particular date, can be Social Security number, can be financial information that a company wants to prove has not been altered, etc. The financial information can include finance revaluation, provisions, consolidation and adjustments, fiscal period transactions, accounting balances, etc.

The encryption module can obtain a private identification 140 of the authorized user, and use the private identification 140 to encrypt the data. There can be one or more authorized users. For example, the encryption module 100 can be required to perform an additional level of verification, such as providing a password, before the encryption module 100 is allowed access to the private key 140. The private identification 140 can be a private key generated as described in this application.

The generation module 110 can add both the data and the encrypted data to create a secure record, i.e. the block. In addition, the generation module 110 can compute and add a hash value of both the data and encrypted data to the block. The computer hash value can be SHA-256 hash value. The generation module 110 can also add the computed hash value to the subsequent block in the block chain to ensure the integrity of the block chain.

The verification module 120 can verify an authenticity of the block and an authenticity of the block chain by decrypting the encrypted data using the public identification 150 of the authorized user. In addition, the verification module 120 can check that the hash value computed by the generation module 110 is identical to a hash value stored in the subsequent block chain.

Unlike the block chain used for cryptocurrencies, the generation module 110 does not necessarily perform the computationally expensive proof of work operation before adding the block to the block chain. One of the reasons why the computationally expensive proof of work is not necessary is that the double spending is not a problem the current technology is attempting to solve. The current technology is reducing the consumption of computational resources such as CPU, bandwidth, and/or memory, by completely avoiding or reducing the proof of work required in order to add a block to the block chain. Some of the main concerns of the technology involve ensuring the accuracy of data contained in a single block, and the accuracy of the block chain.

The generation module 110 can efficiently add the block to the block chain by forgoing the computationally intensive proof of work, or by performing a proof of work computationally at least 500 million times cheaper than the cryptocurrency proof of work.

Figure 2:
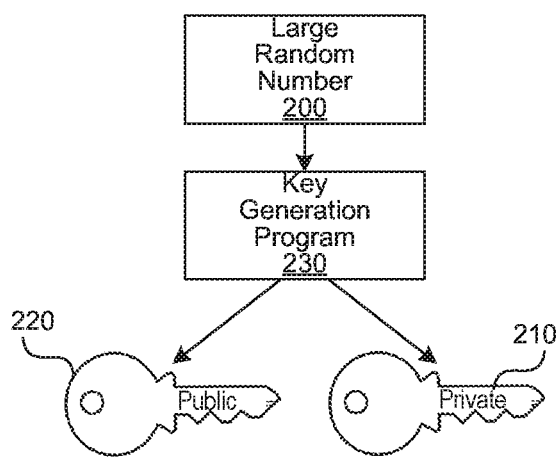
FIG. 2 shows the generation of a private and public identification associated with a user.

FIG. 2 shows the generation of a private and public identification associated with a user. An unpredictable (typically large and random) number 200 is used to begin generation of an acceptable pair of keys 210, 220 suitable for use by an asymmetric key algorithm. The asymmetric key algorithm can rely on mathematical problems that currently admit no efficient solution particularly those inherent in certain integer factorization, discrete logarithm, and elliptic curve relationships.

The unpredictable number 200 is supplied to a key generation program 230, which produces the pair of keys 210, 220. The pair of keys 210, 220 are generally large numbers. The private key 210 can be known only to the owner, while the public key 220 can be broadcast to the public. Knowledge of the public key 220 does not aid in discovering the private key 210.

Figure 3:
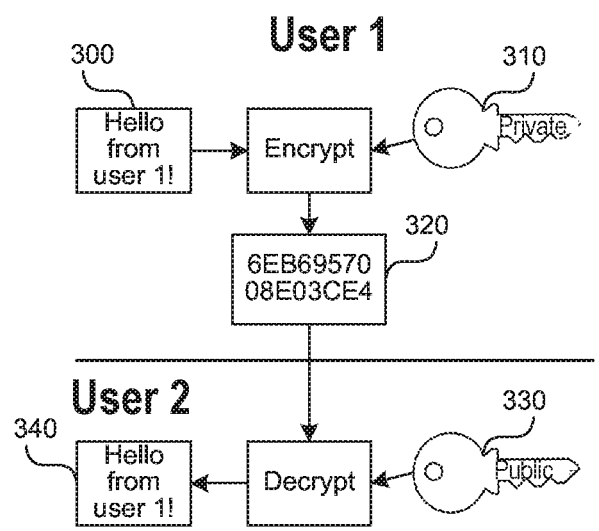
FIG. 3 shows an encrypted communication using a private key and a public key.

FIG. 3 shows an encrypted communication using a private key and a public key. Let us assume that user 1 wants to send a message 300 to user 2 so that user 2 is certain that the message came from user 1. To send a message 300, user 1 encrypts the message 300 with user 1's private key 310. The knowledge of the private key 310 is unique to user 1, and only user 1 can use the private key 310. The encrypted message 320 is unintelligible to a reader.

Upon receiving the unintelligible message 320, user 2 can decrypt the unintelligible message 320 using user 1's public key 330, which has been disseminated to the public including user 2. If the decrypted message 340 can be read by user 2 after decrypting the encrypted message 320 using user 1's public key 330, then user 1 has signed the message using user 1's private key 310. The probability of getting a readable message 340 after decrypting the encrypted message 320 using a public key of somebody other than user 1 is infinitely small, and for all practical purposes can be considered to be 0. Therefore, the fact that the decrypted message 340 is readable is a proof that the encrypted message 320 has been encrypted by user 1.

Figure 4:
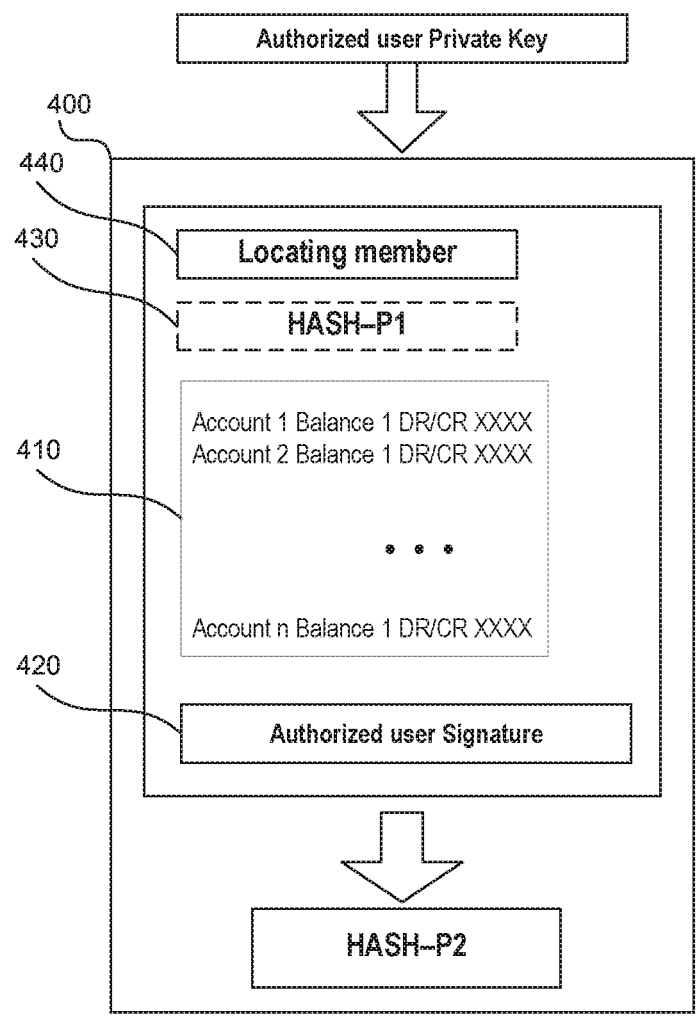
FIG. 4 shows a data structure representing a block in the block chain.

FIG. 4 shows a data structure representing a block in the block chain. The data structure 400 includes a first entry 410, a second entry 420, a third entry 430, a fourth entry 440, and an optional fifth entry 450. The data structure 400 can be efficiently generated and accessed by a processor.

The first entry 410 can include a second data structure representing data to be securely published. The data can be any kind of non-currency data, for which double spending is not a problem. For example, the data can contain personally identifiable data and/or transactional data. The first entry 410 is optional, and in some embodiments, such as when storing personally identifiable data, can be taken out of the data structure 400.

The second entry 420 can include the first entry encrypted with a private identification of an authorized user. The private identification can be a private key, as described in FIGS. 2-3, which uniquely identifies one or more individuals authorized to verify the truthfulness of the first entry. If two or more authorized individuals attempt to add the block to the block chain at the same time, the conflict can be resolved by maintaining a hierarchy of authorized individuals. The hierarchy of authorized individuals indicates which block to enter if there is a conflict.

The authorized individuals can be companies or administrations within the companies. The companies can be in the commercial, financial services and/or public sectors. The authorized individuals can be also defined by regulations, such as the Sarbanes-Oxley Act. A list of authorized individuals, and their public keys, can be kept in a database, such as database 130 in FIG. 1. A record to add to the block chain can be first checked against the public keys of authorized individuals. To perform the checking, the processor can decrypt the second entry 420 with the stored and authorized public keys, and check the decrypted information against the first entry 410. If the decrypted information and the first entry 410 match, the processor can add the submitted record the block chain. If no matches with any of the stored and authorized public keys are found, the processor can refuse to add the submitted record to the block chain.

For example, if both the CFO and the company accountant encrypt the data with their private keys, thus creating two blocks, a processor can check whether the CFO or the company accountant is ranked higher in the hierarchy. After determining that the CFO is ranked higher in the hierarchy, the block signed by the CFO can be added to the block chain, while the block signed by the company accountant can be ignored. Alternatively, after determining that the CFO is ranked higher in the hierarchy than the company accountant, the block signed by the accountant is added first to the block chain, while the block signed by the CFO is added after the block signed by the accountant. Upon reading the block chain, the data contained in a subsequent block in the block chain can override the data contained in a prior block in the block chain. As a result, the block chain created using the current technology does not create branches.

The third entry 430 includes a hash value computed based on the first entry and the second entry. The hash value can be computed using SHA-256 algorithm. The fourth entry 440 includes a locating member enabling the processor to determine a location of a subsequent data structure. The locating member can be a memory pointer to the next block. For example, the next block can be located on the same computer, in which case the locating member 440 contains the memory address at which the next block is located. In another example, the next block can be located on a different computer, in which case the locating member 440 includes at least a network addressed of the computer where the next block is located.

The a fifth entry 450 is included in the data structure 400 when the data structure 400 is not the initial block in the block chain. The fifth entry 450 includes a hash value of a previous block in the block chain. The hash value of the previous block is computed based on the first entry and the second entry of a previous data structure.

Figure 5:
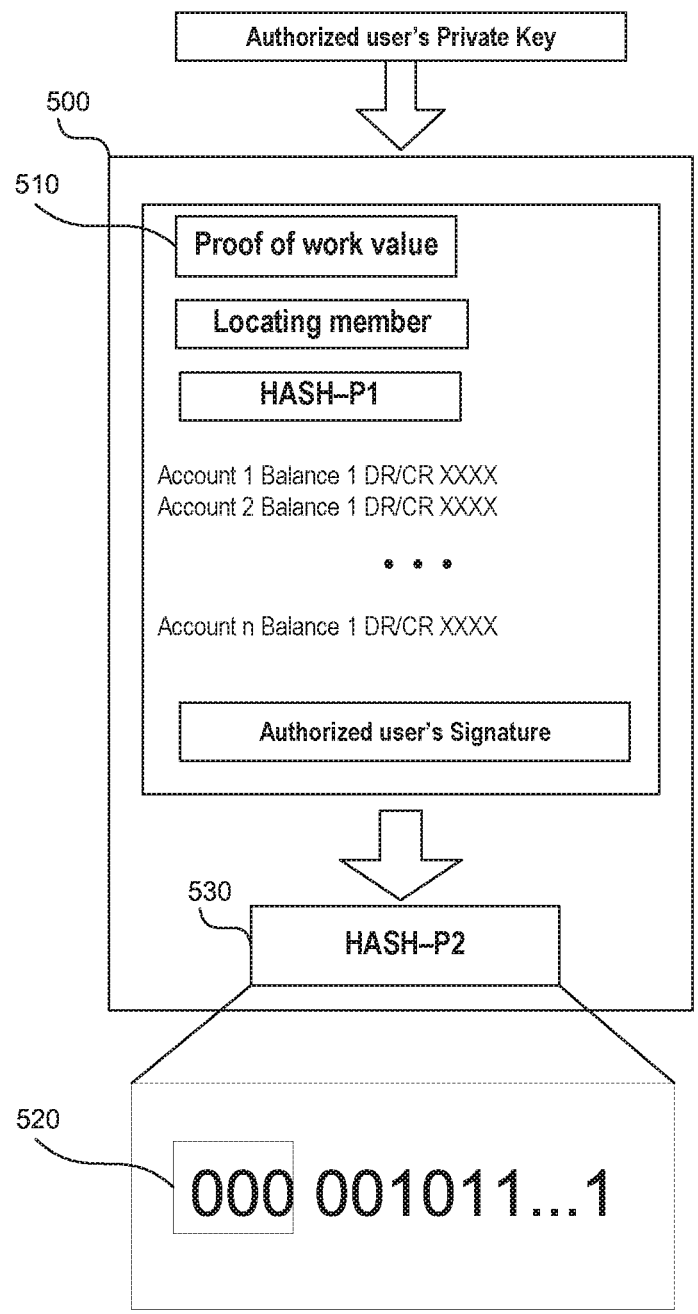
FIG. 5 shows a data structure containing a proof of work value.

FIG. 5 shows a data structure containing a proof of work value. The sixth entry 510 can be included in the data structure 500. The sixth entry can be a proof of work entry designed to indicate that a mildly intensive computation has been performed.

The mildly intensive computation can be designed to require a desired amount of time. To determine the desired amount of time, assume that a time to obtain new data 410 in FIG. 1 to add to the block chain is T. The desired amount of time to perform the proof of work computation can be approximately T. T can be measured in seconds, hours, days months, financial quarters, etc. When proof of work time is significantly less than T, an attack can be mounted on the block chain because a malicious processor can falsify information in the last block in the block chain before a new block is added. If the proof of work time is significantly greater than T, a backlog of new data will be created because of a delay in creating a block containing the proof of work value 510 to add to the block chain.

For example, as shown in FIG. 5, the proof of work value 510 can be a value that when hashed with the contents of the data structure 500 produces a hash value that has the required number of zeros 520. The required number of zeros can be 0, 1, 2, 3, 4. The higher the number of zeros required, the higher the computation needed to find the proof of work value 510. When the required number of zeros is 0, no communication is required. By contrast, bitcoin can require 32 zeros. Requiring three zeros, as in the current technology, and requiring 32 zeros, as in bitcoin computation, is 500 million times cheaper. Therefore, the present computation preserves at least 500 million times more energy than bitcoin.

To determine the desired amount of time for the proof of work computation, initially, a computation can be performed for various required numbers of zeros 1, 2, 3, 4, and the computational time can be measured. The computational time closest to the expected time T can be selected. As new blocks are added to the block chain, the processor can monitor the time, T, of generating new information to be added to the block chain and the amount of time needed to perform the proof of work computation. As the amount of time significantly drops below, or significantly increases above the time T, the processor can adjust the required number of zeros up or down, respectively, to obtain an amount of time for the proof of work computation approximately corresponding to the expected time T. In addition to varying the number of zeros, other proof of work computations can be required such as integer square root modulo prime number, Cuckoo cycle, prime factorization, etc.

The cost of adding new blocks to the block chain depends on the proof of work computation. When the required numbers of zeros is 0, adding new blocks is just as expensive as adding old blocks. However, if the proof of work computation cost becomes positive, the proof of work computation can be designed so that adding new blocks is just as expensive as adding old blocks, adding new blocks is more expensive than adding old blocks, or adding new blocks is less expensive than adding old blocks.

Figure 6:
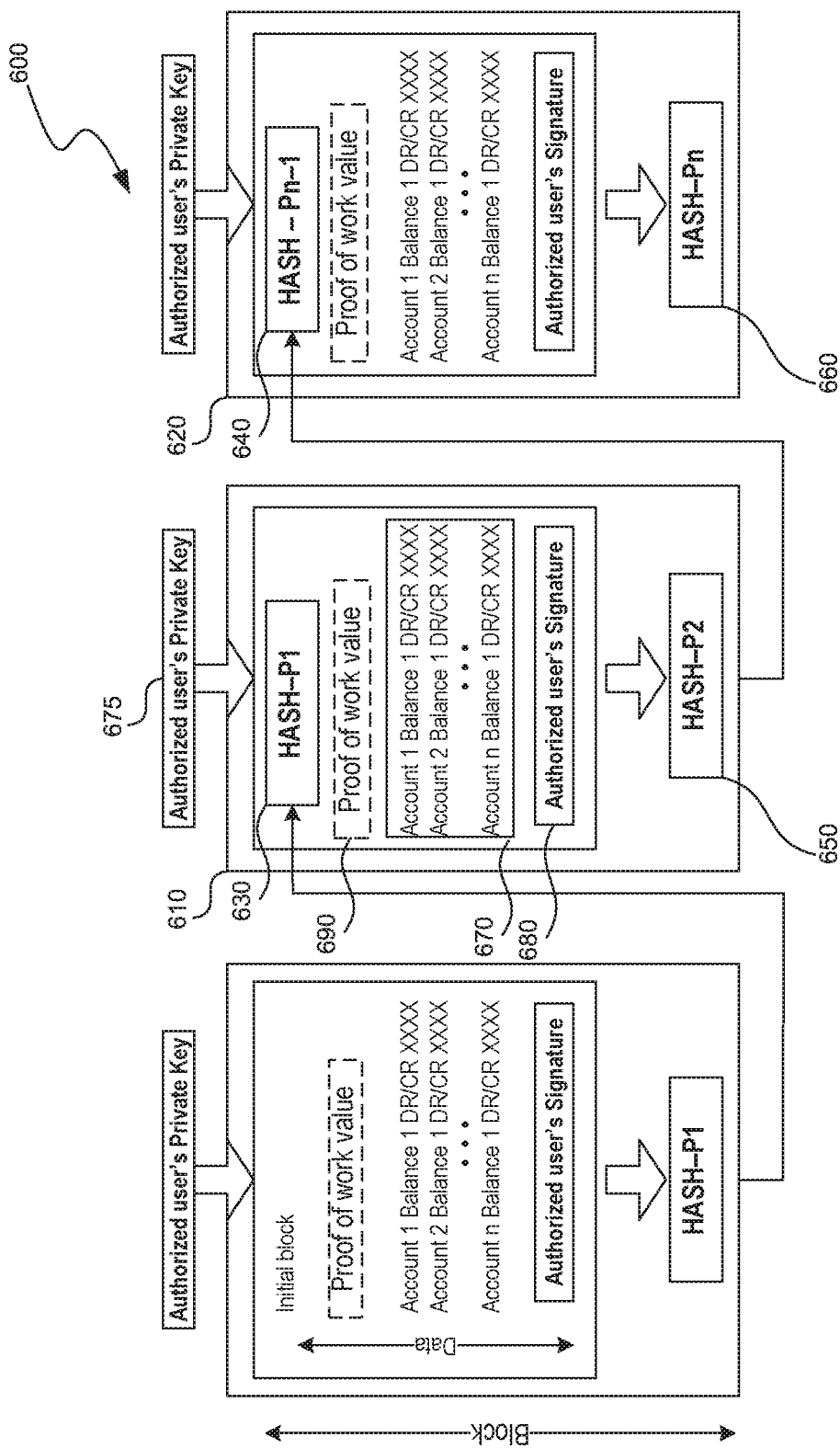
FIG. 6 shows the structure of multiple secure records connected in a sequence.

FIG. 6 shows the structure of multiple secure records connected in a sequence. Each secure record 610, 620 can be a block, while the sequence of secure records 600 can be a block chain. Unlike the block chain of bitcoin, the sequence of blocks can be linear, without branches.

Each secure record 610, 620 can contain a hash value 630, 640 of the previous secure record, respectively. When the hash value 650, 660 for the secure record 610, 620, respectively, is calculated, the hash value 650, 660 contains the hash value 630, 640 of the previous secure record. Consequently, changing a value within the data 670 of block 610, requires re-computing and changing hash values of all the subsequent blocks 620, etc.

In addition, as explained this application, each data 670 of block 610 is signed by a private key 675 of an authorized individual to obtain entry 680. In addition to encrypting the data 670, the entry 680 can also encrypt the previous hash value 630, and the proof of work value 690. If the value within the data 670 is changed, the proof of work value 690 is changed, or the previous hash value 630 is changed, the entry 680 has to be changed. In order to change entry 680, the private key of the authorized individual must be obtained. However, by definition, the private key of the authorized individual is known only to the authorized individual. Thus, the signature of the private individual is an additional mechanism against unauthorized modification of secure records.

Finally, proof of work, if required, can protect against the unauthorized modification of secure records. In this scenario, modifying the data 670 requires re-computing the proof of work value 690 of secure record 610, and all the subsequent secure records 620, etc. By the time, the fraudulent proof of work computation has been performed, new blocks will be added to the sequence of secure records 600. Because the sequence of secure records 600 will be longer than the fraudulent sequence of secure records, the sequence of records 600 will be taken as the true sequence due to the longest chain wins rule. The sequence of secure records 600 can be stored on a single computer or copies of the sequence of records 600 can be stored on multiple computers. In addition, various secure records which are part of a single sequence of secure records 600 can be stored on multiple computers for security purposes.

Figure 7:
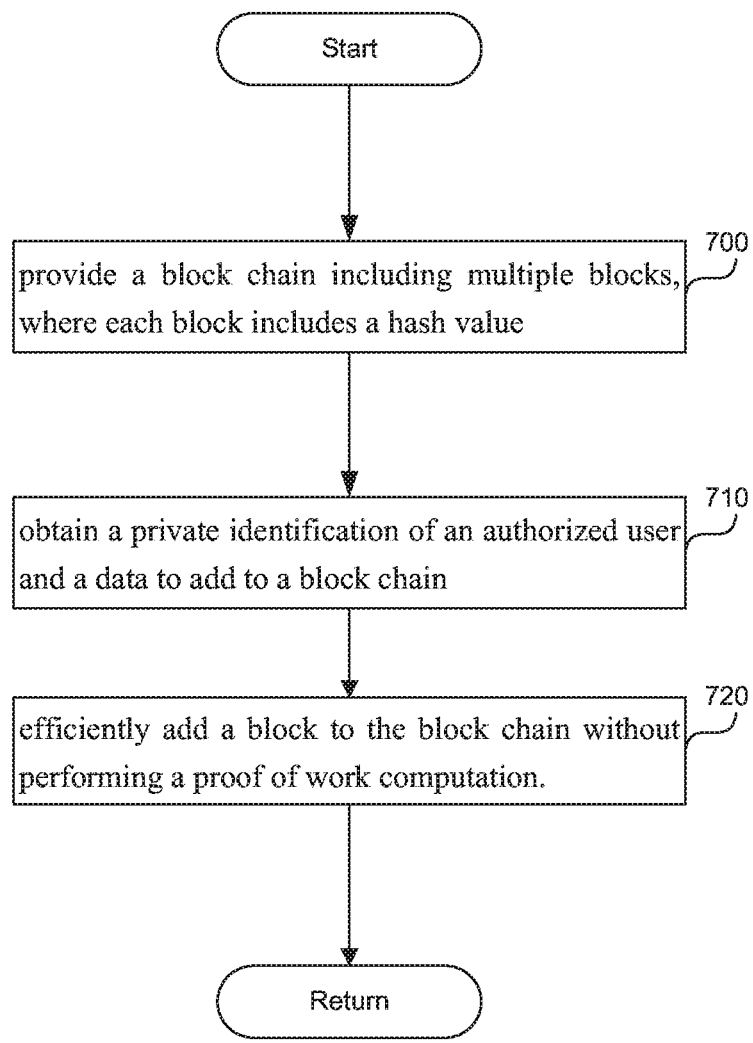
FIG. 7 is a flowchart of a method to efficiently add a block to a block chain.

FIG. 7 is a flowchart of a method to efficiently add a block to a block chain. In step 700, a processor provides a block chain including multiple blocks, where each block includes a hash value.

In step 710, a processor can obtain a private identification of an authorized user and a data to add to a block chain. The private identification can be a private key, as described in this application. In addition, the processor may be asked to identify itself before being given the private identification, such as by providing a password. The data to be added to the block is not susceptible to a double spending problem, i.e. the data is not a currency or a record of currency spending, such that entering the same data twice into the block chain, does not create wealth. Further, the data is to be reliably verified by the authorized user before being added to the block chain.

In step 720, the processor can efficiently add a block to the block chain by encrypting the data using the private identification of the authorized user. Next, the processor can compute a hash value of the data and the encrypted data to obtain a hash value. The processor can obtain a prior hash value associated with a preceding block in the block chain. The processor can create a block from the data, the encrypted data, the hash value and the prior hash value. The processor can add the block to the block chain without performing a proof of work computation, or by performing a mildly intensive proof of work computation.

Figure 8:
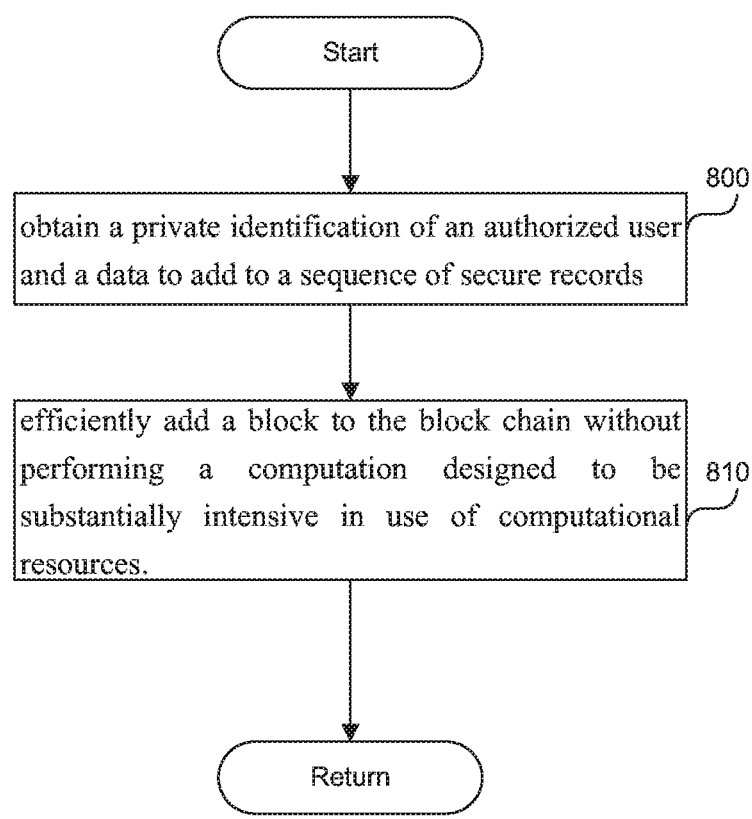
FIG. 8 is a flowchart of a method to efficiently add a secure record to the sequence of secure records.

FIG. 8 is a flowchart of a method to efficiently add a secure record to the sequence of secure records. In step 800, a processor can obtain an identification of an authorized user and a data to add to a plurality of secure records. The private identification can be a private key, as described in this application. In addition, the processor may be asked to identify itself before being given the private identification, such as by providing a password.

In step 810, the processor can efficiently add the secure record to the sequence of secure records by encrypting the data using the identification of the authorized user. The processor can create the secure record based on the data and the encrypted data. Finally, the processor can add the secure record to the plurality of secure records without performing a substantially intensive computation.

To efficiently add the secure record, the processor can obtain multiple required values associated with multiple required bits and multiple required bit positions associated with the multiple required bits. For example, in FIG. 5, multiple required values are 0, 0, 0, multiple required bit positions are 1, 2, 3. In other words, the first 3 bits of the hash value 530 in FIG. 5 are required to be 0. In other embodiments, the requirement can be the first four bits of the hash value 530 are 1, that the first, middle, and last bits are 1,0,0, respectively, etc. The processor can have a maximum limit on the number of required bits, such as four bits.

Next, the processor can find the proof of work value 510 in FIG. 5 causing a hash value of the secure record and the proof of work value 510 to produce a hash value 530 having the required values at the required bits positions. The computation to find the proof of work value 510 is a mildly intensive computation. For example, if the requirement specifies certain values for only two bits (such as the third, and the seventh bit in the hash value), the computation required to find the proof of work value 510 in FIG. 5 is more than 1 billion times cheaper than the equivalent computation performed in the bitcoin proof of work.

The processor can also select a proof of work computation from multiple proof of work computations, such that the time needed to perform the proof of work computation is comparable to the time T before the new secure record is added to the sequence of secure records. For example, the processor can obtain multiple proof of work computations and an expected time T to add a new secure record. The multiple proof of work computations can involve finding a value which when hashed with the existing data in a block produces 1, 2, or 3 leading 1's, can be a factorization problem where the computational time increases by the size of the number, etc.

The processor can determine which of the multiple proof of work computations to use by measuring the compute times associated with the multiple proof of work computations and selecting the proof of work computation to use such that the compute time associated with the proof of work computation is substantially similar to the expected time T to add the new record.

In addition to the data and the encrypted data, the processor can compute a first hash value from the encrypted data and the data, and add the first hash value to the secure record in the sequence of secure records. The first hash value can be computed using SHA-256 hash function.

The processor can verify authenticity of the data contained in the record in several ways. In one embodiment, the processor can compute a second hash value from the data and the encrypted data and compare the second hash value to the first hash value. The authenticity of the data contained in the secure record is confirmed when the first hash value and the second hash value are identical. In another embodiment, the processor can verify the authenticity of the data contained in the secure record by obtaining a public identification associated with the authorized user and decrypting the encrypted data 680 in FIG. 6 using the public identification associated with the user. The authenticity of the data is confirmed when the decrypted data is identical to the data 670 in FIG. 6. If the encrypted data 680 also contained the previous hash value 630 in FIG. 6, and proof of work value 690 in FIG. 6, those values are also compared to ensure that they are identical to the decrypted values.

The processor can further ensure the integrity of the sequence of secure records by obtaining a preceding hash value of the immediately preceding record, and storing the preceding hash value within the secure record. The processor can encrypt the preceding hash value of the immediately preceding record, the data and the identification of the authorized user. Further, the processor can compute a hash value of the preceding hash value, the encryption, and the data. In this case, decrypting the encrypted data with a public key of the authorized user, and verifying that the preceding hash value in the decrypted data is identical to the preceding hash value stored with the secure record, verifies that all the records preceding the current record have been unaltered. Further, re-computing the hash value of the secure record and confirming that it is identical to the hash value stored with the secure record confirms that the current record and all the preceding records have been unaltered.

Finally, the processor can verify that the ordering of the sequence of secure records is accurate by checking that the hash value of the immediately preceding record stored within the secure record is identical to a hash value stored within the immediately preceding record. This verification ensures that an attacker cannot delete a single record within the sequence of secure records.

Computer

Figure 9:
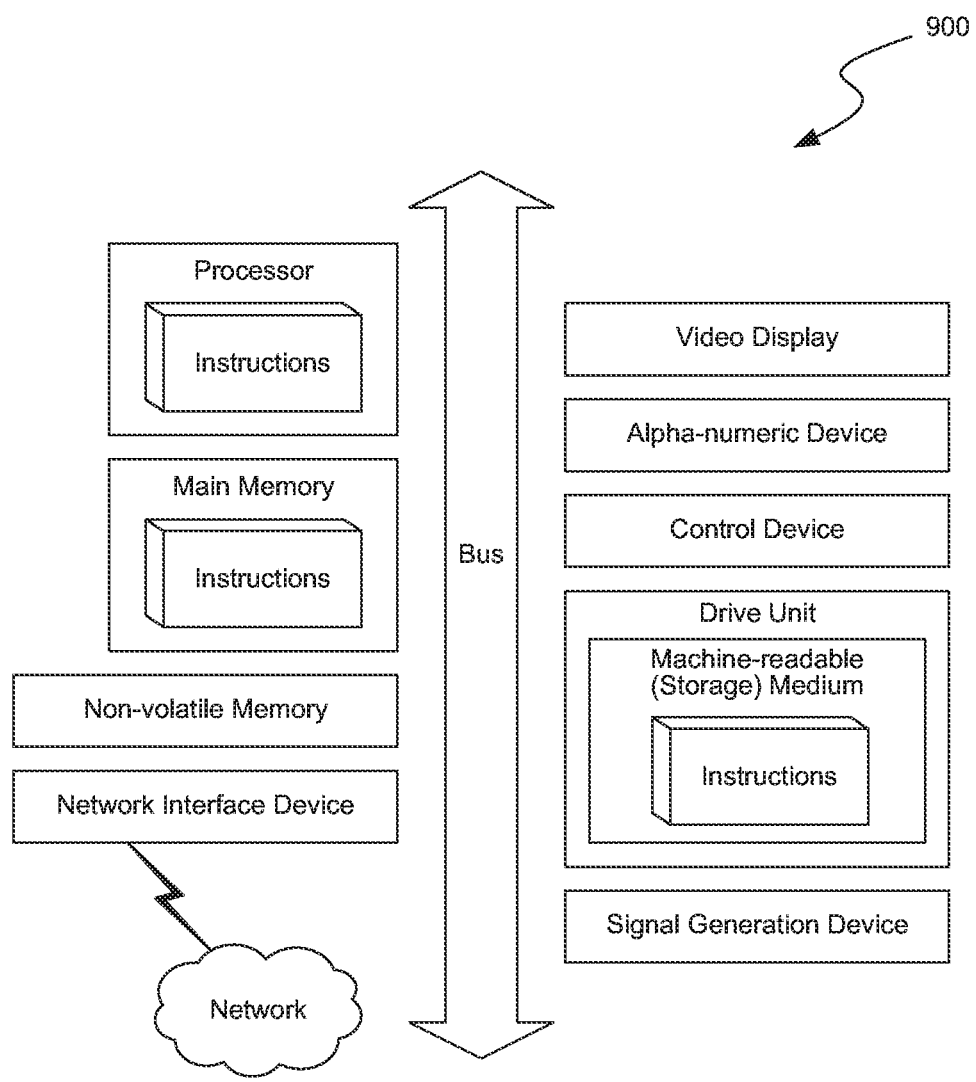
FIG. 9 is a diagrammatic representation of a machine in the example form of a computer system within which a set of instructions, for causing the machine to perform any one or more of the methodologies or modules discussed herein, may be executed.

FIG. 9 is a diagrammatic representation of a machine in the example form of a computer system 900 within which a set of instructions, for causing the machine to perform any one or more of the methodologies or modules discussed herein, may be executed.

In the example of FIG. 9, the computer system 900 includes a processor, memory, non-volatile memory, and an interface device. Various common components (e.g., cache memory) are omitted for illustrative simplicity. The computer system 900 is intended to illustrate a hardware device on which any of the components described in the example of FIGS. 1-8 (and any other components described in this specification) can be implemented. The computer system 900 can be of any applicable known or convenient type. The components of the computer system 900 can be coupled together via a bus or through some other known or convenient device.

The computer system 900 can store all or part of the block chain 600 in FIG. 6 in the drive unit, nonvolatile memory, and/or main memory. Further, the drive unit, nonvolatile memory, and/or main memory can store the data structure 400 in FIG. 4, 500 in FIG. 5. The processor of the computer system 900 can be the processor running the encryption module 100 in FIG. 1 verification module 120 in FIG. 1, and/or generation module 110 in FIG. 1. Further, the processor of the computer system 900 can perform various other operations described in this application.

This disclosure contemplates the computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 900 may include one or more computer systems 900; be unitary or distributed; span multiple locations; span multiple machines; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 900. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing and entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 900. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 9 reside in the interface.

In operation, the computer system 900 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

REMARKS

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A method comprising:
   obtaining an identification of an authorized user and a data to add to a plurality of secure records, the data including a private identification of the authorized user, a previous hash value associated with a previous secure record, and a proof of work value;
   obtaining a plurality of required values associated a plurality of required bits and a plurality of required bit positions associated with the plurality of required bits, wherein a computation associated with the plurality of required bits is mildly computationally intensive;
   determining the proof of work value causing a hash value of a secure record and the proof of work value to produce a hash value comprising the plurality of required values at the plurality of required bit positions;
   encrypting the private identification, the previous hash value, and the proof of work value with the data, the encrypting being configured to recompute the plurality of the secure records if the data, the private identification, the previous hash value, the previous secure record, or the proof of work value are changed; and
   adding a secure record to the plurality of secure records by encrypting the data using the identification of the authorized user, creating the secure record based on the data and the encrypted data, and adding the secure record to the plurality of secure records without performing a computation to calculate the proof of work value or any other proof of work value.

2. The method of claim 1, said adding a secure record without performing the computation, the method comprising:
   obtaining a plurality of proof of work computations and an expected time to add a new secure record; and
   determining the proof of work computation to use by measuring a plurality of compute times associated with the plurality of proof of work computations and selecting the proof of work computation to use in the plurality of proof of work computations, wherein a compute time associated with the proof of work computation is substantially identical to the expected time to add a new record.

3. The method of claim 1, comprising:
computing a first hash value from the encrypted data and the data; and
adding the first hash value to the secure record in the plurality of secure records.

4. The method of claim 3, comprising:
verifying an authenticity of the data contained in the record by computing a second hash value from the data and the encrypted data and comparing the second hash value to the first hash value; and
confirming the authenticity of the data when the first hash value and the second hash value are identical.

5. The method of claim 1, comprising:
obtaining a preceding hash value of an immediately preceding record;
encrypting the preceding hash value of the immediately preceding record, the data and the identification of the authorized user; and
computing a hash value of the preceding hash value of the immediately preceding record, the encryption, and the data.

6. The method of claim 5, wherein the plurality of secure records comprises a sequence of secure records, the method comprising:
verifying an integrity of the sequence of secure records by checking that the hash value of the immediately preceding record stored within the secure record is substantially identical to another hash value stored within the immediately preceding record.

7. The method of claim 1, comprising:
obtaining the public identification of the authorized user and the secure record associated with the plurality of secure records; and
verifying that the authorized user has approved the secure record by decrypting the encrypted data and confirming that the data obtained from decrypting the encrypted data is identical to the data associated with the secure record.

8. A system comprising:
a processor;
a storage medium storing a data structure that can be generated and accessed by the processor, the data structure comprising:
a first entry comprising a second data structure including data to be securely published;
a second entry comprising the data encrypted with a private identification of an authorized user, a previous hash value associated with a another data structure previously generated and accessed by the processor, and a proof of work value, the data being encrypted with the private identification, the previous hash value, and the proof of work value and being configured to recompute the second entry if the data, the private identification, the previous hash value, the previous secure record, or the proof of work value are changed;
a third entry comprising a hash value computed based on the first entry and the second entry; and
a fourth entry comprising a locating member enabling the processor to determine a location of a subsequent data structure, wherein the processor is configured further to:
encrypt the data using the identification of the authorized user to add a secure record; and
create the secure record based on the data and the encrypted data without performing a computation to calculate the proof of work value or any other proof of work value.

9. The system of claim 8, the subsequent data structure comprising:
a fifth entry comprising a second hash value computed based on the first entry and the second entry of a previous data structure.

10. The system of claim 8, the subsequent data structure comprising:
a sixth entry comprising a value indicating that a mildly intensive computation has been performed.

11. The system of claim 8, the locating member comprising a memory address storing the subsequent data structure.

12. The system of claim 8, comprising a second storage medium processor storing instructions that when executed by the processor cause the processor to:
obtain an identification of the authorized user and the data to add to a plurality of secure records; and
add the secure record to the plurality of secure records.

13. The system of claim 12, comprising the processor to:
obtain a plurality of required values associated a plurality of required bits and a plurality of required bit positions associated with the plurality of required bits, the plurality of required bits comprising at most 4 bits; and
determine the proof of work value causing a hash value of the secure record and the proof of work value to produce a hash value comprising the plurality of required values at the plurality of required bits positions.

14. The system of claim 12, comprising the processor to:
compute a first hash value from the first entry and the second entry; and
add the first hash value to the secure record in the plurality of secure records.

15. The system of claim 14, comprising the processor to:
verify an authenticity of the data contained in the record by computing a second hash value from the data and the encrypted data and comparing the second hash value to the first hash value; and
confirm the authenticity of the data when the first hash value and the second hash value are identical.

16. The system of claim 12, comprising the processor to:
obtain a preceding hash value of an immediately preceding record;
encrypt the preceding hash value of the immediately preceding record, the data and the identification of the authorized user; and
compute a hash value of the preceding hash value, the encryption, and the data.

17. The system of claim 12, comprising the processor to:
obtain a public identification of the authorized user and the secure record associated with the plurality of secure records; and
verify that the authorized user has approved the secure record by decrypting the encrypted data and confirming that the data obtained from decrypting the encrypted data is identical to the data associated with the secure record.

18. The system of claim 8, comprising:
an encryption module to obtain the private identification of the authorized user, to encrypt the first entry and to generate the second entry;

a generation module to create a secure record comprising the first entry and the second entry; and a verification module to verify an authenticity of the data structure and an authenticity of a plurality of data structures by decrypting the second entry and by checking that the hash value of the third entry of the data structure is substantially identical to another hash value stored in the subsequent data structure.

\* \* \* \* \*